No. 722,171. PATENTED MAR. 3, 1903.
B. F. S. BADEN-POWELL.
VELOCIPEDE STEERING MECHANISM.
APPLICATION FILED OCT. 6, 1898.
NO MODEL.
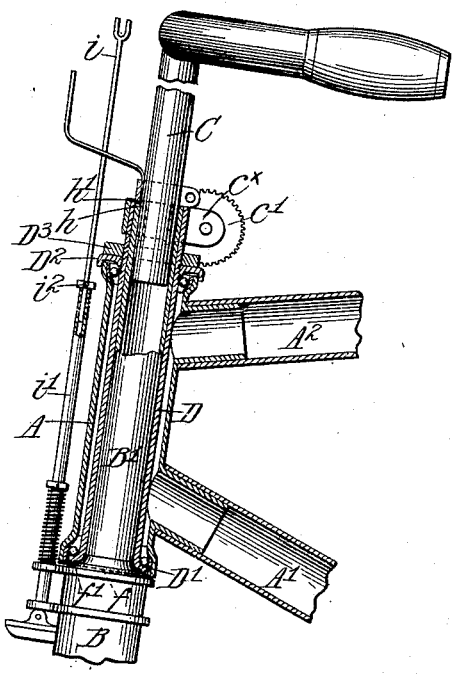
Witnesses:
Inventor
Baden F. S. Baden-Powell
By
James L. Norris
Atty.

UNITED STATES PATENT OFFICE.

BADEN FLETCHER SMYTH BADEN-POWELL, OF LONDON, ENGLAND.

VELOCIPEDE STEERING MECHANISM.

SPECIFICATION forming part of Letters Patent No. 722,171, dated March 3, 1903.

Application filed October 6, 1898. Serial No. 692,847. (No model.)

*To all whom it may concern:*

Be it known that I, BADEN FLETCHER SMYTH BADEN-POWELL, captain Scots Guards, a subject of the Queen of Great Britain, residing at 8 St. George's Place, London, England, have invented certain new and useful Improvements in Velocipede Steering Mechanism, of which the following is a specification.

This invention relates more particularly, although not exclusively, to bicycles; and it has for its chief object to provide means whereby the front part of a bicycle—that is to say, the handle-bar, fork-stem with forks, and the front wheel—can be easily and quickly detached from the main frame of the bicycle when it is desired to reduce the space occupied or to render the bicycle more portable.

Means are already well known for quickly removing the handle-bar from the fork-stem of a bicycle, so as to reduce the width of the space occupied by the same; but my invention is designed to render the fork-stem and forks and the wheel carried thereby also capable of being equally quickly removed, so that the length of the space occupied may be reduced as well as the width.

My improved bicycle will be found especially convenient where the space available for its storage is limited or on occasions when the user requires to convey the bicycle short journeys in a cab or railway-carriage and to quickly attach the parts together again at the end of the journey.

My improvements will also be found very advantageous when it is desired to store bicycles in a crate or box, and such improvements are especially applicable to bicycles used for military and similar purposes for enabling them to be readily taken to pieces and carried on a man's back or on a pack-animal.

According to my invention I so construct a bicycle or other velocipede that the fork-stem, which projects through the steering-head of the steering-bearing and is attached to the handle-bar stem, is capable of being readily disconnected from said head or bearing and from the handle-bar stem, whereby the fork-stem and its fork and the wheel carried thereby may be quickly and easily withdrawn from or connected to the main frame of the velocipede.

In order that my invention may be clearly understood, I will describe the same more fully with reference to the accompanying drawing, in which I have shown by way of example certain means for carrying my invention into effect.

A is the steering-head, A' the main tube, and $A^2$ the top tube of the frame of the velocipede.

B is one of the members of the fork.

B' is the fork-stem, and C the handle-bar stem.

The steering-bearing is formed complete in the steering-head A and independent of the fork-stem steering-post or handle-bar stem. For this purpose I provide an inner tube D, forming the tubular spindle or axle of the bearing and carrying the cones D' $D^2$, upon which the balls bear, the upper of such cones $D^2$ being adjustably mounted upon said tube and adapted to be locked in position by a lock-nut $D^3$ in the well-known manner. The tube D extends somewhat beyond the said lock-nut and is split and provided with a clamping device $c^\times$ of the usual form. The fork stem or tube B' extends through this inner tube, reaching approximately to the upper extremity thereof, and the upper extremity of said fork-stem is split, preferably at three or four places, as shown. The handle-bar stem fits within this split portion, and by means of the aforesaid clamping device (or by a screw-ring or other suitable means) the tubes D and B' are caused to bind and firmly hold said handle-bar.

The clamping device may be operated without the use of a tool by employing a nut having a flange c' of relatively large diameter, the periphery of which flange is notched or serrated, so as to enable the same to be firmly gripped by the hand, or a butterfly-nut may be employed.

In order to provide for an efficient bearing of the fork-stem upon the extremity of the tube D and at the same time permit of its ready withdrawal therefrom, I may provide said fork-stem with a coned surface adapted to bear against the correspondingly-expanded interior lower extremity of the tube D. In the construction shown, however, which represents an existing bicycle suitably modified to embody my invention, I have utilized for this purpose the ordinary ball race or cone $f$, secured to the upper crown-plate of the fork, the lower cone D' of the bearing being formed with an annular ridge or projection $f'$ on its under side for engaging said ball-race $f$. The fork-stem may thus be formed of such a diameter as to slide easily in and out of the tube D. It will be seen that by this construction the height of the handle-bar is capable of adjustment.

In order to insure that the handle-bar shall be set in correct position with regard to the steering-wheel and shall be locked thereto, so as to be incapable of turning independently thereof, I form a recess or slot $h$ in the upper end of the fork-stem and provide a projection $h'$ on the handle-bar stem adapted to enter said recess. This projection may advantageously be formed in one piece with the clip or other attachment of the lamp-bracket, as shown in the drawings.

When a brake is provided on a bicycle, the lower part of the brake-rod is usually tubular, and the upper part is solid and fits into the tubular part telescopically and is secured in any desired position by a set-screw. In order to adapt this form of brake-rod to my invention, I do not rigidly connect the upper part $i$ to the lower part $i'$ of said brake-rod; but I provide a block $i^2$ capable of sliding on the upper part and of being fixed in any desired position by a set-screw, and this block is adapted when the parts are put together to abut against the upper end of the tubular part $i'$, while that portion of the upper part extending below said block enters said tubular part, as shown. This arrangement provides an efficient connection for all practical purposes required.

Having described the invention, what I claim is—

1. The combination with the tubular velocipede-head, an inner tube situated within said head, a separately-removable fork-stem fitting within said inner tube, a separately-removable handle-bar stem detachably and adjustably connected with said fork-stem, a brake-rod formed in two parts unattached to one another, and a block mounted adjustably on the upper part of the brake-rod and adapted to bear against the lower part thereof, all substantially as and for the purpose specified.

2. The combination with a velocipede-head or steering-bearing, having upper and lower ball-races, a removable fork-stem and an upper cone mounted separately from such fork-stem, of a brake-rod formed in two parts not attached together, and a block mounted adjustably on the upper part and adapted to bear against the lower part, substantially as and for the purpose specified.

3. In a velocipede-head, the combination with a steering-head, of an inner tube situated within said head, upper and lower ball-bearings interposed between said head and said inner tube, a detachable fork-stem fitting within said inner tube, a detachable handle-bar stem fitting within said fork-stem, and means for simultaneously locking or unlocking the said fork-stem and handle-bar stem from the inner stem so that said fork-stem and handle-bar stem can be detached from the steering-head without disturbing the inner tube and the ball-bearings, for the purpose specified.

4. The combination with a tubular velocipede-head, of an inner tube situated within said head and having the upper end thereof projecting beyond said head and formed with slits or divisions, cones near the upper and lower ends of said inner tube, the upper cone being adjustable and removable, antifriction-balls interposed between said cones and the inner tube, of a detachable fork-stem fitting within said inner tube and having its upper end formed with slits or divisions, a detachable handle-bar stem fitting within said fork-stem, a clamping device for gripping the slit ends of the fork-stem and inner tube, and a projection on the handle-bar stem adapted to engage with a recess in the fork-stem to prevent independent rotation of the handle-bar stem, substantially as described.

5. The combination with the tubular velocipede-head having upper and lower ball-races separate therefrom, of an inner tube situated within the said head, a separately-removable fork-stem fitting within said inner tube, a separately-removable handle-bar stem detachably connected with said fork-stem, a brake-rod formed in two parts unattached to one another, and a block mounted adjustably on the upper part of the brake-rod and adapted to bear against the lower part thereof, all substantially as and for the purpose specified.

6. In a velocipede-head, the combination with a steering-head, of a removable and detachable handle-bar and stem, a separately-removable fork-stem exterior to said handle-bar stem, a locking-tube interposed between the fork-stem and the steering-head and adapted to detachably secure the handle-bar stem, the fork-stem and the steering-head together, and all of said parts in proper position to form the bearing, and a projection upon the handle-bar stem arranged to enter a recess in the fork-stem.

In testimony whereof I have hereunto set my hand, in presence of two subscribing witnesses, this 20th day of September, 1898.

BADEN FLETCHER SMYTH BADEN-POWELL.

Witnesses:
H. ASHBY NORRIS,
WALTER J. SKERTEN.